United States Patent [19]

Harada et al.

[11] Patent Number: 5,640,669
[45] Date of Patent: Jun. 17, 1997

[54] PROCESS FOR PREPARING METALLIC POROUS BODY, ELECTRODE SUBSTRATE FOR BATTERY AND PROCESS FOR PREPARING THE SAME

[75] Inventors: Keizo Harada; Masayuki Ishii; Kenichi Watanabe; Shosaku Yamanaka, all of Itami, Japan

[73] Assignee: Sumitomo Electric Industries, Ltd., Japan

[21] Appl. No.: 567,145

[22] Filed: Dec. 4, 1995

[30] Foreign Application Priority Data

Jan. 12, 1995 [JP] Japan .................. 7-003451
Mar. 30, 1995 [JP] Japan .................. 7-073553
Apr. 18, 1995 [JP] Japan .................. 7-092321

[51] Int. Cl.$^6$ ........................... B22F 1/00
[52] U.S. Cl. ............. 428/552; 419/2; 419/56; 419/58; 419/37
[58] Field of Search ................ 419/2, 56, 58, 419/37; 428/552

[56] References Cited

U.S. PATENT DOCUMENTS

| | | |
|---|---|---|
| 3,266,893 | 8/1966 | Duddy . |
| 3,408,180 | 10/1968 | Winkler et al. ............ 419/2 |
| 3,536,480 | 10/1970 | Winkler ..................... 419/2 |
| 3,549,423 | 12/1970 | Grubb et al. .............. 419/2 |
| 3,549,505 | 12/1970 | Hanusa . |
| 3,799,808 | 3/1974 | Hancock et al. ......... 136/29 |
| 4,882,232 | 11/1989 | Bugnet et al. . |
| 5,312,580 | 5/1994 | Erickson et al. . |

FOREIGN PATENT DOCUMENTS

| | | |
|---|---|---|
| 0392082 | 10/1990 | European Pat. Off. . |
| 0151064 | 8/1985 | France . |
| 17554 | 9/1963 | Japan . |
| 174484 | 10/1982 | Japan . |

OTHER PUBLICATIONS

Improvement of the High-Rate Discharge Behaviour of the Nickel Electrode, Guy Crespy, et al, pp. 219-237, 1-72.

*Primary Examiner*—Charles T. Jordan
*Assistant Examiner*—Anthony R. Chi
*Attorney, Agent, or Firm*—Bierman, Muserlian and Lucas LLP

[57] ABSTRACT

A process for preparing a metallic porous body, comprising: forming a layer comprising Cu, a Cu alloy, or a precursor thereof onto a skeleton composed of a porous resin body having a three-dimensional network, heat-treating the resin body with the layer formed thereon to remove a heat-decomposable organic component, thereby forming a porous metallic skeleton of Cu or a Cu alloy; and plating the surface of the Cu or Cu alloy skeleton with Ni or an Ni alloy. The heat treating may be carried out by direct induction heating. The metallic porous body is useful as electrodes for batteries, various filters, carriers for catalysts, etc. When the porous body is cut and used as the electrode substrate, the coating of an area, where Cu or its alloy has been exposed by cutting or the like, with a third metal having a lower ionization tendency than Cu or its alloy can provide an electrode substrate having better corrosion resistance and battery service life.

23 Claims, No Drawings

PROCESS FOR PREPARING METALLIC POROUS BODY, ELECTRODE SUBSTRATE FOR BATTERY AND PROCESS FOR PREPARING THE SAME

BACKGROUND OF THE INVENTION

1. Field of Invention

The present invention relates to a process for preparing a metallic porous body for use in electrodes for batteries, various filters, catalyst carriers, etc., particularly a process for preparing a metallic porous body suitable for use as an electrode substrate for an alkaline secondary battery, such as a nickel-cadmium battery, a nickel-zinc battery, and a nickel-hydrogen battery; an electrode substrate for a battery prepared using the metallic porous bodyland its production process.

2. Description of Prior Art

Storage batteries which have been used in various power sources are a lead storage battery and an alkaline storage battery. Of these batteries, the alkaline storage battery has been used widely in various types of portable equipment in the case of a small battery and in industries in the case of a large battery for reasons including that high reliability could be expected and a reduction in size and weight is also possible. In the alkaline storage batteries, zinc, iron, hydrogen, etc. besides cadmium are used as a negative electrode. On the other hand, the positive electrode is, in most cases, a nickel electrode although an air electrode or a silver oxide electrode has been partly accepted. Conversion from a pocket type to a sintering type resulted in improved properties of the alkaline storage battery, and that hermetic sealing has become possible and expanded the applications of the alkaline storage batteries.

In the conventional powder sintering system, when the porosity of the substrate is brought to not less than 85%, the strength is remarkably lowered, limiting the filling of an active material. This in turn limits an increase in the capacity of the battery. For this reason, in the case of a substrate having a higher porosity, i.e., a porosity of not less than 90%, a metallic porous substrate having a three-dimensional network structure, wherein pores are interconnected with one another, or a foam substrate or a fibrous substrate has been proposed instead of the sintered substrate and put to practical use. Such a metallic porous substrate having a high porosity has been prepared by a plating method disclosed in Japanese Patent Laid-Open No. 174484/1982 and a sintering method disclosed in Japanese Patent Publication No. 17554/1963. In the plating method, the surface of a skeleton of a foamed resin, such as a urethane foam, is coated with a carbon powder or the like to render the resin conductive, Ni is electro-deposited on the conductive surface of the resin by electroplating, and the foamed resin and carbon are then removed, thereby preparing a metallic porous body. According to this method, steps for the preparation of the metallic porous body are complicated although the resultant metallic porous body can satisfy strength and other requirements. On the other hand, in the sintering method, a slurried metal powder is impregnated into the surface of the skeleton in a foamed resin, such as a urethane foam, and the impregnated foamed resin is then heated to sinter the metal powder. Celmet comprising Ni metal (a product of Sumitomo Electric Industries, Ltd.) is already commercially available as the metallic porous body prepared by these methods and has been used as an electrode substrate for an alkaline secondary battery.

The application of the above conventional metallic porous body to an electrode substrate for a battery has contributed greatly to an increase in the capacity of the battery. In the case of an large alkaline secondary battery contemplated for use in electric cars or the like, however, the electrode substrate, for a battery, using the conventional Ni porous body, because of large electrode area, has high electrical resistance and, hence, causes a large voltage drop at high discharge rates, limiting the output from the battery. Further, potential distribution occurs within the plate face, resulting in lowered charging efficiency.

SUMMARY OF THE INVENTION

Under these circumstances, an object of the present invention is to provide a process for preparing a metallic porous body which has low electrical resistance and excellent corrosion resistance and is useful as electrodes for batteries, various filters, and catalyst carriers, an electrode substrate using a metallic porous body prepared by the process, and a process for preparing the electrode substrate.

In particular, the present invention aims mainly to provide an Ni metallic porous body having lowered electrical resistance and improved corrosion resistance. Specifically, when a metallic porous body is used as a plate for an alkaline secondary battery, the metallic element is limited to Ni. For this reason, the present invention provides a novel process for preparing a metallic porous body having a three-dimensional network structure having a skeleton interior comprising Cu or a Cu alloy with the surface portion comprising Ni or an Ni alloy, thereby improving the corrosion resistance and, at the same time, lowering the electrical resistance of the metallic porous body, that is, thereby solving the above problems of the conventional metallic porous body associated with the use thereof as a plate for a battery. Further, the present invention provides a process for preparing an electrode substrate, for a battery, which can provide further improved battery properties by further enhancing corrosion resistance of the metallic porous body prepared by the above process, and an electrode substrate, for a battery, prepared by the above process.

The present inventors have made extensive and intensive studies and, as a result, have found that the above problems can be solved by a particular metallic porous body or an electrode substrate prepared using the same, which has led to the completion of the present invention.

Specifically, the present invention provides:

a process for preparing a metallic porous body having a three-dimensional network structure composed of a skeleton interior comprising Cu or a Cu alloy with a surface portion comprising Ni or an Ni alloy, the process comprising: forming a layer comprising Cu, a Cu alloy, or a precursor thereof onto a skeleton composed of a porous resin body having a three-dimensional network structure, heat-treating the resin body with the layer formed thereon to remove a heat-decomposable organic component, thereby forming a porous metallic skeleton of Cu or a Cu alloy; and plating the surface of the Cu or Cu alloy skeleton with Ni or an Ni alloy.

The porous metallic skeleton of Cu or a Cu alloy may be formed by coating a porous resin body having a three-dimensional network structure with a powder of Cu or a Cu alloy or a precursor thereof and then heat-treating the coated porous resin body in a non-oxidizing atmosphere; or by coating a skeleton of a porous resin body having a three-dimensional network structure with a powder of Cu or a Cu alloy or a precursor thereof, subjecting the coated porous resin body to direct induction heating in an oxygen-containing atmosphere at a temperature of 400° to 900° C. to remove a heat-decomposable organic component, and subjecting the heat-treated product to direct induction heating at a temperature of 800° to 1200° C. in a reducing atmosphere to conduct sintering.

Further, the porous metallic skeleton of Cu or a Cu alloy may be formed by subjecting the surface of the resin body having a three-dimensional network structure to a treatment for rendering the surface of the resin body conductive, electrolytically plating the conductive surface with a Cu or Cu alloy coating, and heat-treating the electroplated resin body in a non-oxidizing atmosphere.

The treatment for rendering the resin body conductive may he carried out by coating the porous resin body with a conductive metallic paste or a carbon paste or by electroless plating.

A metallic porous body having a three-dimensional network structure, prepared by any of the processes, having a skeleton interior comprising Cu or a Cu alloy with the surface portion comprising Ni or an Ni alloy may be cut into a shape of an electrode substrate for a battery and used as an electrode substrate for a battery. An electrode substrate, for a battery, having further improved corrosion resistance and long service life can be provided by immersing the cut substrate in a solution of a compound of a third metal having a lower ionization tendency than Cu or its alloy to coat an area, where Cu or a Cu alloy has been exposed, with the third metal by taking advantage of a substitution reaction.

The present invention provides the above process for preparing an electrode substrate and a plate prepared by said process.

The solution of the third metallic compound may be a silver potassium cyanide solution, and the concentration of free KCN in the solution is preferably not less than 10 g/liter with the concentration of Ag in the solution being preferably not less than 5 g/liter.

DETAILED DESCRIPTION OF THE PREFERRED EMBODIMENTS

In the formation of a porous metallic skeleton of Cu or a Cu alloy (an alloy skeleton being also referred herein as "metallic skeleton"), Cu, a Cu alloy, or a precursor thereof, that is, a powder of an oxide or the like, which is converted to Cu or a Cu alloy in the later step of heating, may be applied to a resin core body by a method wherein a resin core body is coated or impregnated with a paste or slurry composed mainly of any one of the powders and an organic binder, a method which comprises coating a resin core body with a binder resin and either spraying any one of the powders on the coated resin core material or shaking the resin core body coated with the binder resin in any one of the powders and other methods. In some cases, the powder used may be a mixture of at least two of Cu, a Cu alloy, and precursor powders, which also falls within the scope of the present invention. Preferably, the powder has an average particle size of not more than 50 µm. This is because when the powder has an average particle size exceeding 50 µm, it becomes difficult to evenly coat the surface of the skeleton of the resin core body with the powder, which causes a lowered degree of sintering and increased defects, making it impossible to provide desired properties.

Binders usable in the paste include an acrylic resin and a phenolic resin. These binders can contribute to shape retention until Cu or a Cu alloy is sintered and, after sintering, are burned out without leaving any residue.

The resin body having a three-dimensional network structure is typically a polyurethane foam. In particular, when the use of the metallic porous body in an electrode substrate for an alkaline battery is contemplated, a resin foam in a sheet form is used. Beside the foamed resin, a felt, a nonwoven fabric, or a woven fabric formed of a resin fiber may be used.

When the formation of a film containing Cu, a Cu alloy, or a precursor thereof is followed by heating in a non-oxidizing atmosphere to remove a heat-decomposable organic component, the heating temperature is preferably about 1000° C. The heat treatment causes the resin component as the core body to be burned out and, at the same time, the Cu or Cu alloy film to become strong. The heat treatment is carried out in the non-oxidizing atmosphere for the purpose of preventing the oxidation of Cu or the Cu alloy. Further, in this case, when an oxide of Cu or the like is used as the precursor, it is positively reduced to provide a metallic porous body having a strong three-dimensional network structure comprising Cu or a Cu alloy.

The use of direct induction heating by high frequency as the heat treatment means enables satisfactory heat treatment in a short time and, at the same time, can prevent breaking of the skeleton structure caused by melting even when the temperature is above the melting point of Cu or a Cu alloy component.

Two-stage heat treatment, that is, direct induction heating in an oxygen-containing atmosphere followed by direct induction heating in a reducing atmosphere, may be used instead of the above-mentioned heat treatment in a non-oxidizing atmosphere. In this heat treatment method, the step of subjecting the powder-containing layer applied by coating to the porous resin core body to direct induction heating in an oxygen-containing atmosphere is carried out in order to burn out an organic resin component, such as a binder, and a core resin in oxygen in a short time. As a result of experiments conducted by the present inventors, it has been found that, although most of the resin component can be removed by vaporization by the above heat treatment in a non-oxidizing atmosphere, unsatisfactory heat treatment causes part of the resin component to be carbonized and to remain as carbon and the residual carbon often greatly inhibits the progress of the sintering of the Cu powder. Accordingly, in the present invention, the occurrence of residual carbon by carbonization of the resin is prevented by the heat treatment in an oxygen-containing atmosphere, thereby improving the degree of sintering of Cu or a Cu alloy. In this case, the heating temperature should be 400° C. or above which exceeds the decomposition combustion temperature of the resin component. Further, it should be 900° C. or below because the progress of the oxidation of the Cu or Cu alloy at a high rate makes it impossible to maintain the structure of the porous body. The use of direct induction heating by high frequency as the heat treatment enables satisfactory heating treatment in a short time of usually not more than 1 min, which is very effective in preventing the progress of the oxidation of the resultant Cu or Cu alloy. In the above step of heat treatment, organic resin components, such as the resin core body and the binder, are almost completely removed and, at the same time, sintering proceeds to some extent in parallel with the oxidation of the Cu or Cu alloy, enabling the skeleton structure of the porous body to be maintained.

Subsequently, heat treatment by direct induction heating in a reducing atmosphere, such as a hydrogen stream, is carried out at a temperature in the range of from 800° to 1200° C. to remove the oxide film, formed by the previous step, and conduct sintering. The heat treatment at a temperature of below 800° C. results in neither satisfactory reducing treatment nor satisfactory progress of sintering. On the other hand, when the temperature is above 1200° C., Cu or its alloy melts, making it impossible to maintain the porous skeleton structure. In this case, the use of direct induction heating by high frequency as the heat treatment means enables reduction and sintering in a short time, simplifying the process and, at the same time, preventing breaking of the skeleton structure by melting even in the case of a temperature of above the melting point of Cu or its alloy.

Further, the porous skeleton of Cu or a Cu alloy can be formed also by subjecting the surface of the resin body having a three-dimensional network structure to a treatment for rendering the surface of the resin body conductive, electrolytically plating the conductive surface with a Cu or Cu alloy coating, and subjecting the plated resin body to the above heat treatment in a non-oxidizing atmosphere or two-stage heat treatment to form a porous skeleton of Cu or a Cu alloy. The treatment for rendering the surface of the resin body conductive may be carried out by coating the resin body with a conductive paste containing a conducting material, such as Cu, or a carbon paste or by forming a conductive undercoat on the resin body by electroless Cu plating, electroless Ni plating or the like.

The above steps provide a porous body comprising Cu or a Cu alloy as a skeleton metal. In order to impart corrosion resistance necessary for practical use, the surface of the porous body is electrolytically plated to form an Ni plating film (an Ni alloy plating film as well as an Ni film plating being referred to simply as "Ni plating film"). A conventional Watts bath for Ni or an Ni alloy plating can be used for electrolytic Ni plating.

The plating of the surface of the skeleton with Ni or an Ni alloy provides a metallic porous body having a two-layer metallic laminate structure. According to this method, a metallic porous body having a laminate structure is provided wherein the skeleton metal comprises Cu or its alloy and the surface portion comprises Ni or an Ni alloy. In this laminate structure, the surface of a porous skeleton comprising Cu or a Cu alloy having low specific resistance is plated with Ni or an Ni alloy having excellent corrosion resistance. Therefore, the use of this porous body in an electrode for a battery results in improved current collection efficiency, reduced generation of heat by loss resistance, high strength, and prolonged service life of the battery. In this case, after Ni plating, heat treatment may be carried out in a non-reducing atmosphere to evaporate the residue of the plating solution and anneal the Ni plating. This is also an embodiment of the present invention. The heat treatment temperature is preferably 750° C. or below. When the temperature is above 750° C., the diffusion of Ni/Cu becomes significant, making it impossible to provide properties inherent in the Cu or Cu alloy and the Ni or Ni alloy, that is, low resistance for the Cu or Cu alloy and corrosion resistance for the Ni or Ni alloy.

In the metallic porous body prepared by the above processes, the specific resistance of Cu (or a Cu alloy) constituting the interior skeleton is about ¼ of Ni (or an Ni alloy), enabling the electrical resistance of the whole metallic porous body to be lowered and, consequently, the above problems, associated with the use of the metallic porous body as a plate for a battery, to be eliminated. Further, since Cu (or a Cu alloy) is easily eluted in an alkaline electrolyte within a battery, the coating of the surface thereof with Ni or an Ni alloy can avoid the elution of Cu or the Cu alloy, enhance the corrosion resistance of the plate, and improve the service life of the battery. In an actual battery production process, the plate is prepared by cutting a metallic porous body into a predetermined size and conducting filling of an active material or the like or by filling the metallic porous body with an active material and then cutting the material into a predetermined size. In any case, an area, where Cu or a Cu alloy is exposed, occurs at the cut end. Further, in the coating with Ni or an Ni alloy, it is difficult to completely coat the Cu or Cu alloy, leaving some pinholes. For this reason, when the use of the metallic porous body as a plate for a battery is contemplated, a metal having a lower ionization tendency than Cu or its alloy is used for coating, thereby eliminating lowering in corrosion resistance derived from the elution of Cu from the partially exposed Cu or Cu alloy portion and realizing a plate having a long service life. Such metallic elements include Ag, Pt, Pd, and Au. Among them, Ag is preferred from the viewpoint of cost. These third metals per se do not elute in charging and discharging potentials in conventional alkaline secondary batteries. As described above, according to the electrode substrate structure of the present invention, a plate, for a battery, having low electrical resistance and excellent corrosion resistance can be realized, and the application of this plate to an alkaline secondary battery enables high output and high efficiency charging and discharging and can reduce the generation of heat in the battery caused by loss resistance.

In the present invention, coating with the third metal is preferably carried out by immersing a metallic porous body, having a three-dimensional network structure composed of a skeleton interior comprising Cu or a Cu alloy with the surface portion comprising Ni or an Ni alloy, in a silver potassium cyanide solution to coat only an area, where Cu or a Cu alloy has been exposed, with Ag by taking advantage of a substitution reaction. These metals have the ionization relationship: Ni>Cu>Ag. Therefore, when Ni/Cu metal is immersed in a solution containing Ag ions (a silver potassium cyanide solution), a reaction represented by the formula Ni→Ni$^{2+}$+2e$^-$ occurs on the surface of Ni, resulting in the elution of Ni, while a local battery reaction causes electrons collected on the Cu side to combine with Ag ions, creating a reaction represented by the formula Ag$^+$+e$^-$→Ag on the surface of Cu to precipitate Ag. According to this method, only the Cu or Cu alloy surface can be selectively coated with Ag by a very simple process. Further, since the exposed area of the Cu or Cu alloy is much smaller than the surface area of the Ni or Ni alloy, the consumption of Ag is very small and the elution of Ni can be suppressed on such a level as will pose no practical problem.

According to a still preferred embodiment, the concentration of free KCN and the concentration of Ag in the silver potassium cyanide solution are respectively not less than 10 g/liter and not less than 5 g/liter. When the free KCN concentration is less than 10 g/liter or when the Ag concentration is less than 5 g/liter, it is difficult to stably provide a homogeneous Ag coating even when the Ag concentration, bath temperature, and immersion time are regulated.

The present invention will now be described in more detail with reference to the following Examples.

EXAMPLE 1

50% by weight of a Cu powder having an average particle size of 10 μm, 10% by weight of an acrylic resin, 2% by weight of carboxymethyl cellulose, and 38% by weight of water were mixed together for 12 hr to prepare a slurry.

The slurry was then impregnated into a polyurethane foam having a thickness of 2.5 mm and about 50 pores per inch, and excess slurry in the impregnated polyurethane foam was removed with squeeze rolls. The coated polyurethane foam thus obtained was then allowed to stand at room temperature for one hr, thereby drying the coated polyurethane foam. The coated polyurethane foam was heated in a steam stream to 1050° C. at a rate of 30° C./min and heat-treated at 1050° C. for 10 min to prepare a Cu porous body having a three-dimensional network structure. The metallic porous body was electrolytically plated with Ni in a Watts bath for Ni plating under a current density of 10 A/dm$^2$ to form an Ni plating at 100 g/m$^2$.

For the metallic porous body, the weight of Cu and Ni, the porosity, and the electrical resistance were evaluated. The results are given in Table 1. For comparison, the porosity and electrical resistance of a conventional metallic porous body of Ni alone having the same weight are also summarized in Table 1.

TABLE 1

| | Weight (g/m²) | | Porosity | Electrical resistance |
|---|---|---|---|---|
| | Cu | Ni | (%) | (mΩ/100 mm) |
| Example 1 | 500 | 100 | 96 | 13 |
| Comparative Example 1 | — | 600 | 96 | 40 |

EXAMPLE 2

A polyurethane foam having a thickness of 2.5 mm and about 50 pores per inch was subjected to a treatment for rendering the foam conductive, that is, immersed in a plating bath (iSulcup. ELC-SR, manufactured by Uemura Kogyo Kabushiki Kaisha) having a temperature of 55° C. for 5 min to electrolessly plate the foam with Cu at 10 g/m², and electrolytically plated in a copper sulfate plating bath at 3 A/dm² to form a Cu plating at 240 g/m². The plated foam was heated in a nitrogen stream to 800° C. at a rate of 40° C./min and heat-treated at 800° C. for 5 min to prepare a Cu porous body having a three-dimensional network structure. The Cu porous body was plated with Ni in the same manner as in Example 1 to form an Ni plating at 50 g/m². For the metallic porous body, the weight of Cu and Ni, the porosity, and the electrical resistance were evaluated. The results are given in Table 2. For comparison, the porosity and electrical resistance of a conventional metallic porous body of Ni alone having the same weight are also summarized in Table 2.

TABLE 2

| | Weight (g/m²) | | Porosity | Electrical resistance |
|---|---|---|---|---|
| | Cu | Ni | (%) | (mΩ/100 mm) |
| Example 2 | 250 | 50 | 96 | 26 |
| Comparative Example 2 | — | 300 | 96 | 80 |

EXAMPLE 3

50% by weight of a Cu powder having an average particle size of 10 µm, 10% by weight of an acrylic resin, 2% by weight of carboxymethyl cellulose, and 38% by weight of water were mixed together for 5 hr to prepare a Cu slurry. The slurry was then impregnated into a polyurethane foam having a thickness of 2.5 mm and about 50 pores per inch, and excess slurry in the impregnated polyurethane foam was removed with squeeze rolls. The coated polyurethane foam thus obtained was then allowed to stand at room temperature for one hr to dry the coating, thereby preparing a resin core sheet coated with the Cu powder.

This sheet was cut into a size of 200 mm in width and 500 mm in length which was then heat-treated by the following procedure. A direct induction heating device having a high-frequency coil, having a width of 250 mm, a height of 30 mm, and a length of 600 mm (30 turns) which was connected to a high-frequency power source having a frequency of 2 MHz was used. In this case, the high-frequency coil was installed within a stainless steel chamber so that the heat treatment atmosphere could be controlled.

At the outset, induction heating treatment was carried out as a first-stage heat treatment in the air at 700° C. for 20 sec. In this stage, the output of the power source was 2 kW. The organic component in the sheet was substantially completely burned out by the first-stage heat treatment. The analysis revealed that the residual carbon content was not more than 0.01% by weight. In this stage, the sheet had black appearance due to the oxidation of Cu, and the progress of sintering to some extent resulted in an area reduction of 18%.

Subsequently, induction heating treatment at 1000° C. for 30 sec was carried out as a second-stage heat treatment in a $H_2$ (hydrogen) stream. In this stage, the output of the power source was 3 kW. This heat treatment leads to the completion of reduction and sintering to give a porous body of Cu metal. This porous body is designated as sample 3A.

For comparison, only the second-stage heat treatment was carried out without the first-stage heat treatment. The resultant porous body is designated as sample 3B. The areal density of the samples 3A and 3B was 400 g/m².

Thereafter, the samples 3A and 3B were electrolytically plated with Ni in a Watts bath for Ni plating under a current density of 10 A/dm² to form an Ni plating at 100 g/m². The resultant plated samples were designated as 3A1 and 3B1. For comparison, an Ni porous body having an areal density of 500 g/m² (trade name Celmet, manufactured by Sumitomo Electric Industries, Ltd.) was prepared and designated as sample 3C.

The samples 3A1 and 3B1 were heat-treated under various conditions, and the tensile strength, elongation, and the electrical resistance thereof were then measured. The results are given in Table 3.

TABLE 3

| No. | Sample | Heat treatment conditions (after Ni plating) | Tensile strength (kg/15 mm) | Elongation (%) | Electrical resistance (mΩ/100 mm) |
|---|---|---|---|---|---|
| 1 | 3A1 | None | 6.1 | 2.8 | 11 |
| 2 | 3A1 | 500° C., 5 min | 5.8 | 3.5 | 12 |
| 3 | 3A1 | 600° C., 5 min | 5.9 | 3.8 | 13 |
| 4 | 3A1 | 700° C., 5 min | 5.6 | 3.7 | 14 |
| 5 | 3A1 | 800° C., 5 min | 2.1 | 0.5 | 89 |
| 6 | 3B1 | None | 1.1 | 0.4 | 29 |
| 7 | 3B1 | 600° C., 5 min | 0.8 | 0.6 | 32 |
| 8 | 3B1 | 800° C., 5 min | 0.9 | 0.5 | 180 |
| 9 | 3C | None | 4.6 | 5.2 | 40 |

The results given in Table 3 shows that the process according to the present invention can provide a metallic porous body having good properties.

Application Example

Material Nos. 3 and 9 of Example 3 were cut into plates, for a battery, having a size of 150 mm×120 mm, and positive electrodes, for an Ni-hydrogen secondary battery, using them as a collector were prepared as follows. An active material paste composed mainly of nickel hydroxide was press-packed into a metallic porous body, smoothed, and dried at 120° C. for 1 hr, and the resultant plate was pressed at a pressure of 1 ton/cm² to a thickness of 0.7 mm. For the sample 3B1, the strength property was so low that it was impossible to prepare a plate, for a battery, from the sample 3B1.

10 sheets of the positive electrode, 10 sheets of a negative electrode formed of a known metal hydride electrode based on MmNi (misch metal nickel), and separators formed of a hydrophilized nonwoven fabric of polypropylene were used to construct a square airtight Ni-hydrogen battery. A solution of 25 g/liter of lithium hydroxide dissolved in an aqueous potassium hydroxide solution having a specific gravity of 1.25 was used as an electrolyte. The batteries prepared from the metallic porous samples 3A1 and 3C by the above procedure were designated respectively as 3A1-D and 3C-D.

For the batteries, the discharge voltage and the discharge capacity in the case of discharge currents of 10 A and 150 A were investigated. The results are given in Table 4.

TABLE 4

| Battery No. | Discharge at 10 A | | Discharge at 150 A | |
|---|---|---|---|---|
| | V | Ah | V | Ah |
| 3A1-D | 1.23 | 101 | 1.16 | 102 |
| 3C-D | 1.18 | 98 | 1.02 | 82 |

EXAMPLE 4

Preparation of metallic porous body

A polyurethane foam having a thickness of 2.5 mm and about 50 pores per inch was subjected to a treatment for rendering the foam conductive, that is, immersed for 5 min in a plating bath (Sulcup ELC-SR, manufactured by Uemura. Kogyo Kabushiki Kaisha) having a temperature of 55° C. to electrolessly plate the foam with Cu at 10 g/m$^2$, and electrolytically plated in a copper sulfate plating bath at 3 A/dm$^2$ to form a Cu plating at 450 g/m$^2$. The plated foam was then heated in a hydrogen stream to 800° C. at a rate of 40° C./min and heat-treated at 800° C. for 5 min to prepare a Cu porous body having a three-dimensional network structure which was then electrolytically plated in a Watts bath for Ni plating under a current density of 10 A/dm$^2$ to form an Ni plating at 100 g/m$^2$.

A sample, of the resultant metallic porous body, having a width of 10 mm and a length of 100 mm had an electrical resistance of 12 mΩ/100 mm. This metallic porous body was designated as sample 4A.

50% by weight of a Cu powder having an average particle size of 10 μm, 10% by weight of an acrylic resin, 2% by weight of carboxymethyl cellulose, and 38% by weight of water were mixed together for 5 hr to prepare a Cu slurry. The slurry was then impregnated into a polyurethane foam having a thickness of 2.5 mm and about 50 pores per inch, and excess slurry in the impregnated polyurethane foam was removed with squeeze rolls. The coated polyurethane foam thus obtained was then allowed to stand at room temperature for one hr, thereby drying the coated polyurethane foam. Thereafter, the coated polyurethane foam was heated in a hydrogen stream to 850° C. at a rate of 30° C./min and heat-treated at 850° C. for 10 min to prepare a Cu porous body having a three-dimensional network structure. The areal density of the Cu porous body was 450 g/m$^2$. The Cu porous body was electrolytically plated with Ni in a Watts bath for Ni plating under a current density of 10 A/dm$^2$ to form an Ni plating at 100 g/m$^2$. A sample, of the metallic porous body, having a length of 100 mm had an electrical resistance of 11 mΩ/100 mm. This metallic porous body was designated as sample 4B.

For comparison, a metallic porous body of Ni alone (Celmet, manufactured by Sumitomo Electric Industries, Ltd.) was prepared and designated as sample 4C. This Ni porous body had an areal density of 550 g/m$^2$ and an electrical resistance of 43 mΩ/100 mm.

The samples 4A, 4B and 4C thus obtained were cut into a size of 150 mm×120 mm to prepare electrode substrates for a battery. As a further electrode substrate, sample 3A1 prepared in Example 3 was cut into the same size to prepare sample 4D.

In this case, for some of each of the samples 4A, 4B and 4D, in order to coat an area, where Cu had been exposed by cutting, with Ag, these samples were immersed for 10 sec in a Ag potassium cyanide solution of temperature of 30° C., having a Ag concentration of 6 g/liter and a free KCN concentration of 12 g/liter, prepared by mixing and dissolving 10 g of KAg(CN)$_2$ and 12 g of KCN in 1000 g of water. The treated samples were examined. As a result, it was confirmed that only the area, where Cu had been exposed, was coated with Ag of 0.2 μm in thickness.

Among samples which had been prepared by cutting the samples 4A, 4B and 4D, samples with Cu, exposed to the end face, being coated with Ag were designated respectively as samples 4A1, 4B1 and 4D1.

Positive electrodes, for an Ni-hydrogen secondary electrode, using the metallic porous body samples 4A, 4B, 4C, 4D, 4A1, 4B1 and 4D1 as a collector were prepared as follows. An active material paste composed mainly of nickel hydride was press-packed into each metallic porous body, smoothed, and dried at 120° C. for one hr, and the resultant plate was pressed at a pressure of 1 ton/cm$^2$ to a thickness of 0.7 mm.

10 sheets of the positive electrode, 10 sheets of a negative electrode formed of a known metal hydride electrode based on MmNi (misch metal nickel), and separators formed of a hydrophilized nonwoven fabric of polypropylene were used to construct a square airtight Ni-hydrogen battery. A solution of 25 g/liter of lithium hydroxide dissolved in an aqueous potassium hydroxide solution having a specific gravity of 1.25 was used as an electrolyte. The batteries prepared from the metallic porous samples 4A, 4B, 4C, 4D, 4A1, 4B1 and 4D1 by the above procedure were designated respectively as 4A-D, 4B-D, 4C-D, 4D-D, 4A1-D, 4B1-D and 4D1-D.

For the batteries, the discharge voltage and the discharge capacity in the case of discharge currents of 10 A and 150 A were investigated. For evaluating the service life, the capacity retention after 500 charging/discharging cycles in the case of a discharge of 10 A was measured. The results are given in Table 5.

TABLE 5

| Battery No. | Discharge at 10 A | | Discharge at 150 A | | Percentage capacity retention after 500 cycles |
|---|---|---|---|---|---|
| | V | Ah | V | Ah | |
| 4A-D | 1.23 | 101 | 1.16 | 99 | 79 |
| 4B-D | 1.22 | 103 | 1.15 | 100 | 76 |
| 4C-D | 1.18 | 101 | 1.02 | 82 | 93 |
| 4D-D | 1.23 | 102 | 1.16 | 100 | 80 |
| 4A1-D | 1.23 | 102 | 1.15 | 98 | 94 |
| 4B1-D | 1.22 | 104 | 1.16 | 101 | 93 |
| 4D1-D | 1.23 | 103 | 1.16 | 101 | 94 |

As is apparent from the results, the batteries 4A1-D, 4B1-D and 4D1-D of the present invention had especially excellent battery properties.

For the sample 4A, Ag coating after cutting was carried out under different conditions to evaluate the thickness and uniformity of the Ag coating. The results of evaluation are given in Table 6.

TABLE 6

| No. | Ag concentration (g/l) | Free KCN concentration (g/l) | Bath temp. (°C.) | Immersion time (sec) | Ag coating thickness (μm) | Uniformity* |
|---|---|---|---|---|---|---|
| 1 | 3 | 5 | 30 | 5 | <0.1 | x |
| 2 | 3 | 5 | 30 | 15 | <0.1 | x |
| 3 | 3 | 5 | 50 | 5 | <0.1 | x |
| 4 | 3 | 5 | 50 | 15 | <0.1 | x |
| 5 | 3 | 10 | 30 | 5 | 0.1 | x |
| 6 | 3 | 10 | 30 | 15 | 0.1 | x |
| 7 | 3 | 10 | 50 | 5 | 0.1 | x |
| 8 | 3 | 10 | 50 | 15 | 0.1 | x |
| 9 | 3 | 15 | 30 | 5 | 0.2 | x |
| 10 | 3 | 15 | 30 | 15 | 0.2 | x |
| 11 | 3 | 15 | 50 | 5 | 0.3 | x |
| 12 | 3 | 15 | 50 | 15 | 0.3 | x |
| 13 | 5 | 5 | 30 | 5 | 0.2 | x |
| 14 | 5 | 5 | 30 | 15 | 0.2 | x |
| 15 | 5 | 5 | 50 | 5 | 0.2 | x |
| 16 | 5 | 5 | 50 | 15 | 0.2 | x |
| 17 | 5 | 10 | 30 | 5 | 0.3 | o |
| 18 | 5 | 10 | 30 | 15 | 0.3 | o |
| 19 | 5 | 10 | 50 | 5 | 0.3 | o |
| 20 | 5 | 10 | 50 | 15 | 0.3 | o |
| 21 | 5 | 15 | 30 | 5 | 0.4 | o |
| 22 | 5 | 15 | 30 | 15 | 0.4 | o |
| 23 | 5 | 15 | 50 | 5 | 0.4 | o |
| 24 | 5 | 15 | 50 | 15 | 0.4 | o |
| 25 | 7 | 5 | 30 | 5 | 0.3 | x |
| 26 | 7 | 5 | 30 | 15 | 0.3 | x |
| 27 | 7 | 5 | 50 | 5 | 0.3 | x |
| 28 | 7 | 5 | 50 | 15 | 0.3 | x |
| 29 | 7 | 10 | 30 | 5 | 0.4 | o |
| 30 | 7 | 10 | 30 | 15 | 0.4 | o |
| 31 | 7 | 10 | 50 | 5 | 0.4 | o |
| 32 | 7 | 10 | 50 | 15 | 0.4 | o |
| 33 | 7 | 15 | 30 | 5 | 0.5 | o |
| 34 | 7 | 15 | 30 | 15 | 0.5 | o |
| 35 | 7 | 15 | 50 | 5 | 0.5 | o |
| 36 | 7 | 15 | 50 | 15 | 0.6 | o |

*o:Coating thickness distribution within Ag coating face ≦±30% x:Coating thickness distribution within Ag coating face >±30%

The present invention can provide a metallic porous body having a laminate structure of two metals of Cu and Ni which may be their alloys. This metallic laminate structure has a uniform thickness and possesses low resistance and excellent corrosion resistance. The use thereof particularly as an electrode substrate for a battery results in reduced voltage drop at a high discharge rate, large output, and high charging efficiency.

What is claimed is:

1. A process for preparing a metallic porous body having a three-dimensional network structure composed of a skeleton interior comprising Cu or a Cu alloy with a surface portion comprising Ni or an Ni alloy, the process comprising:

forming a layer comprising Cu, a Cu alloy, or a precursor thereof on a skeleton composed of a porous resin body having a three-dimensional network;

heat-treating the resin body with the layer formed thereon to remove a heat-decomposable organic component, thereby forming a porous metallic skeleton of Cu or a Cu alloy; and plating the surface of the Cu or Cu alloy skeleton with Ni or an Ni alloy.

2. A process according to claim 1, wherein said heat treating is carried out by direct induction heating.

3. The process according to claim 1, wherein heat treatment in a non-oxidizing atmosphere at 750° C. or below is carried out after said Ni plating or Ni alloy plating.

4. The process according to claim 1, wherein the porous metallic skeleton of Cu or a Cu alloy is formed by coating the porous resin body having a three-dimensional network structure with a powder of Cu or a Cu alloy or a precursor thereof and then heat-treating the coated porous resin body in a non-oxidizing atmosphere.

5. The process according to claim 1, wherein the porous metallic skeleton of Cu or a Cu alloy is formed by coating the porous resin body having a three-dimensional network structure with a powder of Cu or a Cu alloy or a precursor thereof, subjecting the coated porous resin body to direct induction heating in an oxygen-containing atmosphere at a temperature of 400° to 900° C. to remove a heat-decomposable organic component, and subjecting the heat-treated product to direct induction heating at a temperature of 800° to 1200° C. in a reducing atmosphere to conduct sintering.

6. The process according to claim 4, wherein the powder of Cu, a Cu alloy, or a precursor thereof has an average particle size of not more than 50 μm.

7. The process according to claim 5, wherein the powder of Cu, a Cu alloy, or a precursor thereof has an average particle size of not more than 50 μm.

8. The process according to claim 1, wherein the porous metallic skeleton of Cu or a Cu alloy is formed by subjecting the surface of the porous resin body having a three-dimensional network structure to a treatment for rendering the surface of the resin body conductive, electrolytically plating the conductive surface with a Cu or Cu alloy coating, and heat-treating the plated resin body in a non-oxidizing atmosphere.

9. The process according to claim 8, wherein the treatment for rendering the resin body conductive is carried out by coating the porous resin body with a conductive metallic paste or a carbon paste or by electroless plating.

10. The process according to claim 9, wherein the electroless plating is Cu plating or Ni plating.

11. A process preparing an electrode substrate for a battery, comprising:

forming a layer comprising Cu, a Cu alloy, or a precursor thereof on a skeleton composed of a porous resin body having a three-dimensional network, heat-treating the resin body with the layer formed thereon to remove a heat-decomposable organic component, thereby forming a porous metallic skeleton of Cu or a Cu alloy; and plating the surface of the Cu or Cu alloy skeleton with Ni or an Ni alloy to provide a metallic porous body having a three-dimensional network structure composed of a skeleton interior comprising Cu or a Cu alloy with a surface portion comprising Ni or an Ni alloy;

cutting the metallic porous body into a shape of an electrode substrate for a battery; and immersing the cut substrate in a solution of a compound of a third metal having a lower ionization tendency than the Cu or alloy to coat an area, where the Cu or Cu alloy has been exposed, with the third metal by taking advantage of a substitution reaction.

12. A process according to claim 11, wherein said heat treating is carried out by direct induction heating.

13. The process according to claim 11, wherein heat treatment in a non-oxidizing atmosphere at 750° C. or below is carried out said Ni plating or Ni alloy plating.

14. The process according Lo claim 11, wherein the porous metallic skeleton of Cu or a Cu alloy is formed by coating the porous resin body having a three-dimensional network structure with a powder of Cu or a Cu alloy or a precursor thereof and then heat-treating the coated porous resin body in a non-oxidizing atmosphere.

15. The process according to claim 11, wherein the porous metallic skeleton of Cu or a Cu alloy is formed by coating the porous resin body having a three-dimensional network structure with a powder of Cu or a Cu alloy or a precursor thereof, subjecting the coated porous resin body to direct induction heating in an oxygen-containing atmosphere at a temperature of 400° to 900° C. to remove a heat-decomposable organic component, and subjecting the heat-treated product to direct induction heating at a temperature of 800° to 1200° C. in a reducing atmosphere to conduct sintering.

16. The process according to claim 14, wherein the powder of Cu, a Cu alloy, or a precursor thereof has an average particle size of not more than 50 µm.

17. The process according to claim 15, wherein the powder of Cu, a Cu alloy, or a precursor thereof has an average particle size of not more than 50 µm.

18. The process according to claim 11, wherein the porous metallic skeleton of Cu or a Cu alloy is formed by subjecting the surface of the porous resin body having a three-dimensional network structure to a treatment for rendering the surface of the resin body conductive, electrolytically plating the conductive surface with a Cu or Cu alloy coating, and heat-treating the plated resin body in a non-oxidizing atmosphere.

19. The process according to claim 18, wherein the treatment for rendering the resin body conductive is carried out by coating the porous resin body with a conductive metallic paste or a carbon paste or by electroless plating.

20. The process according to claim 19, wherein the electroless plating is Cu plating or Ni plating.

21. The process according to claim 11, wherein the solution of the compound of the third metal is a silver potassium cyanide solution and the concentration of free KCN in the solution is not less than 10 g/liter and the concentration of Ag in the solution is not less than 5 g/liter.

22. An electrode substrate, for a battery, constituting a support for an active material used as a current collector, said electrode substrate comprising a metallic porous body having a three-dimensional network structure composed of a skeleton interior comprising Cu or a Cu alloy with a surface portion comprising Ni or an Ni alloy, an area, where Cu or the Cu alloy has been exposed, being coated with a third metal having a lower ionization tendency than Cu or the Cu alloy.

23. The electrode substrate for a battery according to claim 22, wherein the third metal is Ag.

\* \* \* \* \*